(12) United States Patent
Venkitachalam et al.

(10) Patent No.: US 7,966,615 B2
(45) Date of Patent: Jun. 21, 2011

(54) TRANSITIONING OF VIRTUAL MACHINE FROM REPLAY MODE TO LIVE MODE

(75) Inventors: Ganesh Venkitachalam, Moutain View, CA (US); Michael Nelson, Alamo, CA (US); Daniel J. Scales, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/266,171

(22) Filed: Nov. 6, 2008

(65) Prior Publication Data

US 2009/0119665 A1 May 7, 2009

Related U.S. Application Data

(60) Provisional application No. 60/985,953, filed on Nov. 6, 2007.

(51) Int. Cl.
G06F 9/455 (2006.01)
G06F 9/46 (2006.01)
G06F 11/00 (2006.01)

(52) U.S. Cl. ............ 718/1; 718/100; 714/2; 714/11; 714/12; 714/13; 714/20

(58) Field of Classification Search .......... 718/1, 100, 718/101, 102, 103, 104, 105; 714/100, 2, 714/3, 6, 11–17, 20

See application file for complete search history.

(56) References Cited

U.S. PATENT DOCUMENTS

| | | | | |
|---|---|---|---|---|
| 5,488,716 A * | 1/1996 | Schneider et al. | ............... | 714/10 |
| 5,805,790 A * | 9/1998 | Nota et al. | ...................... | 714/10 |
| 6,023,772 A * | 2/2000 | Fleming | ........................ | 714/13 |
| 6,421,739 B1 * | 7/2002 | Holiday | ........................ | 719/330 |
| 6,625,751 B1 * | 9/2003 | Starovic et al. | ................. | 714/11 |
| 6,795,966 B1 * | 9/2004 | Lim et al. | ........................... | 718/1 |
| 6,832,367 B1 * | 12/2004 | Choi et al. | ..................... | 717/130 |
| 7,213,246 B1 * | 5/2007 | van Rietschote et al. | ........ | 718/1 |
| 7,287,197 B2 * | 10/2007 | Bennett et al. | .................. | 714/48 |
| 7,313,793 B2 * | 12/2007 | Traut et al. | ........................ | 718/1 |
| 7,529,897 B1 * | 5/2009 | Waldspurger et al. | ........ | 711/162 |
| 7,603,715 B2 * | 10/2009 | Costa et al. | ..................... | 726/25 |
| 7,774,647 B2 * | 8/2010 | Vertes | ............................. | 714/15 |
| 7,840,839 B2 * | 11/2010 | Scales et al. | .................... | 714/13 |
| 7,908,653 B2 * | 3/2011 | Brickell et al. | ................. | 726/22 |
| 2005/0262411 A1 * | 11/2005 | Vertes et al. | ................... | 714/741 |
| 2006/0085792 A1 * | 4/2006 | Traut | ............................. | 718/100 |
| 2006/0167950 A1 * | 7/2006 | Vertes | ........................... | 707/200 |

(Continued)

OTHER PUBLICATIONS

George W. Dunlap, Samuel T. King, Sukru Cinar, Murtaza A. Basrai, Peter M. Chen; ReVirt: Enabling Intrusion Analysis through Virtual-Machine Logging and Replay; Proceedings of the 2002 Symposium on Operating Systems Design and Implementation (OSDI); pp. 1-14.*

(Continued)

Primary Examiner — Meng A An
Assistant Examiner — Abdullah Al Kawsar

(57) ABSTRACT

A backup VM is allowed to enter live execution mode at instruction boundaries but not in the middle of emulation of a single instruction. This is accomplished by having the last log entry of multiple entries generated during emulation of an instruction to have an indication of a "go-live" point and by having the backup VM not replay log entries provided by the primary VM beyond the log entry that indicates the "go-live" point.

28 Claims, 8 Drawing Sheets

U.S. PATENT DOCUMENTS

| | | | |
|---|---|---|---|
| 2008/0022032 A1* | 1/2008 | Nicholas et al. | 711/100 |
| 2009/0031307 A1* | 1/2009 | Chodroff et al. | 718/100 |
| 2009/0070761 A1* | 3/2009 | Zhao | 718/1 |
| 2009/0089879 A1* | 4/2009 | Wang et al. | 726/24 |
| 2009/0119493 A1* | 5/2009 | Venkitachalam et al. | 712/238 |
| 2009/0119538 A1* | 5/2009 | Scales et al. | 714/6 |

OTHER PUBLICATIONS

J. Hamilton Slye; Supporting nondeterministic execution in fault-tolerant systems; Fault Tolerant Computing, 1996., Proceedings of Annual Symposium on; pp. 250-259.*

Thomas C. Bressoud; Hypervisor-Based Fault-Tolerance; ACM Transactions on Computer Systems, vol. 14, No. 1, Feb. 1996, pp. 80-107.*

Brendan Cully; Generalized High Availability via Virtual Machine Replication; Oct. 2007.*

Paul T. Murray; Somersault: Enabling Fault-Tolerant Distributed Software Systems; Hewlett-Packard Company 1998.*

Slye, J.H. et al., "Supporting nondeterministic execution . . . ", Published: Jun. 25, 1996.

* cited by examiner

TRANSITIONING OF VIRTUAL MACHINE FROM REPLAY MODE TO LIVE MODE

RELATED APPLICATION

This application claims priority from U.S. Provisional Application No. 60/985,953 filed Nov. 6, 2007, which provisional application is incorporated herein by reference in its entirety.

BACKGROUND

1. Technical Field

This disclosure relates generally to a virtualized computer system and, in particular, to a method and system for a virtual machine to transition from replay mode to live execution mode.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100, and one or more layers or co-resident components comprising system-level software, such as an operating system or similar kernel, or a virtual machine monitor or hypervisor (see below), or some combination of these. The system hardware 100 typically includes one or more processors 110, memory 130, and physical hardware devices including some form of mass storage 140 and various other devices 170.

Each VM 200 will typically have both virtual system hardware 201 and guest system software 202. The virtual system hardware 201 typically includes at least one virtual CPU 210, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270. Although FIG. 1 illustrates that the virtual system hardware 201 is included in the VMs 200, the virtual system hardware 201 may reside in a gray area between the VM 200 and a VMM 300-1 or in the VMM 300-1 itself.

Referring back to FIG. 1, note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, . . . , 210-m (VCPU0, VCPU1, . . . , VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resources such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software" or "virtualization logic"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software. Also, as various virtualization functionalities may be implemented either in software or hardware, the invention described below may be used in virtualized computer systems having any type or configuration of virtualization logic. Although the invention is described below in terms of virtualization software, substantially the same description applies with respect to virtualization logic.

Moreover, FIG. 1 shows virtual machine monitors that appear as separate entities from other components of the virtualization software. Furthermore, some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210-0, 210-1, . . . , 210-m, the virtual memory 230, the virtual disk 240, and the virtual device(s) 270, are shown as being part of the VM 200 for the sake of conceptual simplicity. In actuality, these "components" are usually implemented as software emulations 330 included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, possibly as well as a console operating system that, in some architectures, is used to boot the system and facilitate certain user interactions with the virtualization software.

Note that the kernel 600 (also referred to herein as the "VMkernel") is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

The kernel 600 is responsible for initiating physical input/output (I/O) on behalf of the VMs 200 and communicating the I/O completion events back to the VMs 200. In fully virtualized systems, I/O completion events often take the form of a virtual interrupt delivered to one of the virtual processors (VCPUs) of the requesting VM.

Virtualized computer systems are often provided with fault tolerance capabilities, so that the virtualized computer system may continue to operate properly in the event of a failure of one of the VMs. One way of providing fault tolerance is to run two virtual machines (a "primary" virtual machine, and a "backup" or "secondary" virtual machine) in near lockstep. In some implementations, the backup VM replays log entries recorded by and received from the primary VM to mimic the operation of the primary VM (i.e., record by primary VM and replay by backup VM). When the primary VM faults, the backup VM stops replaying the log entries and transitions to live execution mode to resume interactive execution with the real world. The act of the backup VM resuming interactive execution with the external world is referred to herein as "going-live." When the backup VM is being replayed from the recorded log entries, most external inputs including network packets and interrupts are obtained from the log entries received from the primary VM. In contrast, when the backup VM goes live and resumes interactive execution, the backup VM does not depend on the recorded log entries any more and interacts with Input/Output (I/O) devices and thus, the external world.

This disclosure relates to limiting the execution points at which the backup VM can go live and resume interactive execution with the external world.

SUMMARY

Embodiments of the present disclosure include a method and system for allowing a backup VM to enter live execution mode at instruction boundaries but not in the middle of emulation of an instruction. This is accomplished by having the last log entry of the multiple log entries generated during emulation of an instruction include an indication of a "go-live" point and by having the backup VM not replay log entries provided by the primary VM beyond the log entry that indicates the "go-live" point.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

The present invention as described herein may be used to advantage in both a hosted and a non-hosted virtualized computer system, regardless of the degree of virtualization, in which the virtual machine(s) have any number of physical and/or logical virtualized processors. The present invention may also be implemented directly in a computer's primary operating system (OS), both where the OS is designed to support virtual machines and where it is not. Moreover, the invention may even be implemented wholly or partially in hardware, for example in processor architectures intended to provide hardware support for virtual machines. The present invention may be implemented as a computer program product including computer instructions configured to perform the methods of the present invention. The computer program can be stored on a computer readable storage medium to run on one or more processors of the virtualized computer system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 2:
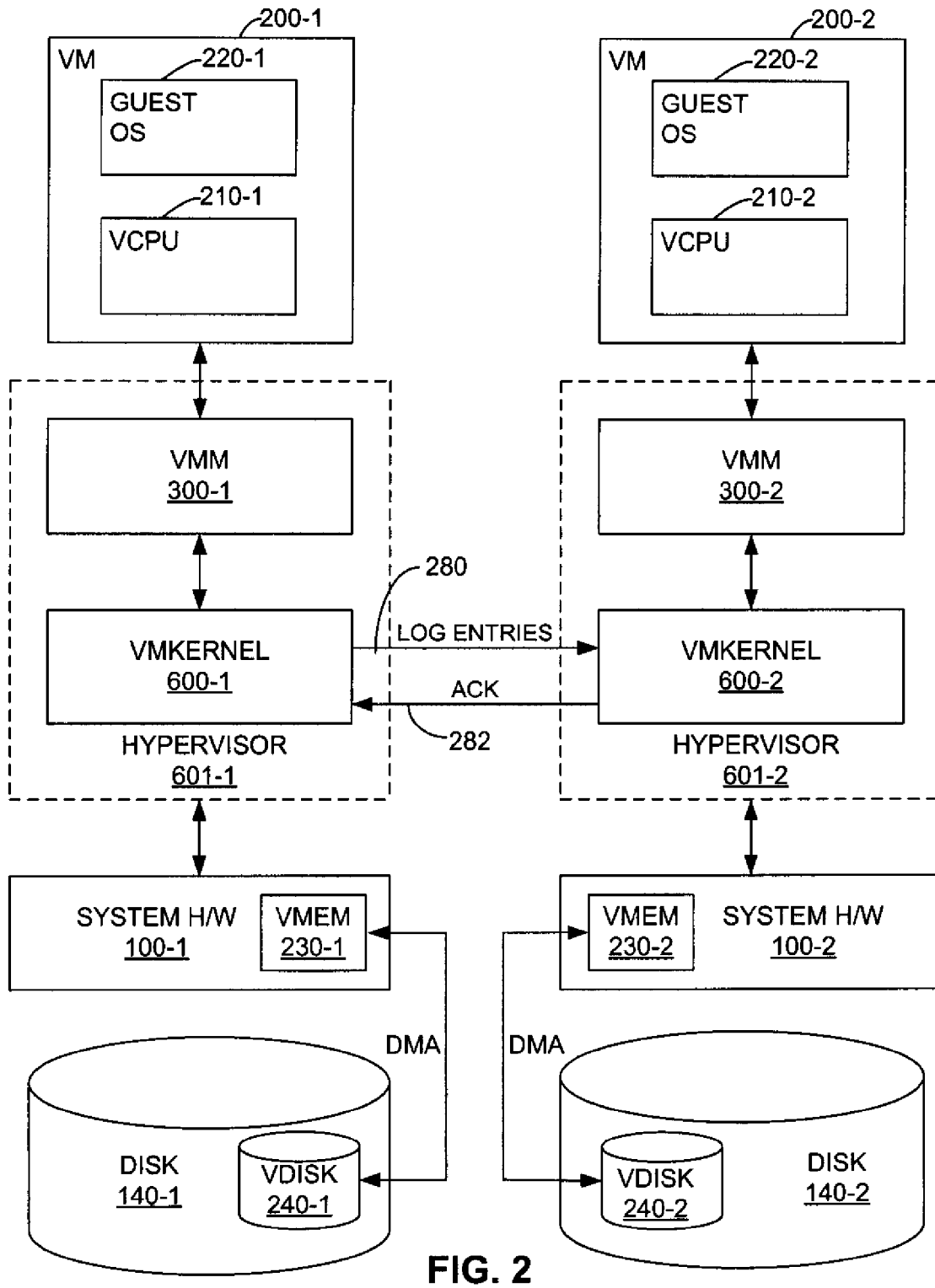
FIG. 2 illustrates a system for providing fault tolerance using a backup VM supporting a primary VM, with the primary VM and backup VM each accessing its separate virtual disk on separate physical devices, according to one embodiment.

FIG. 2 illustrates a system for providing fault tolerance using a backup VM 200-2, executing on a host 100-2, supporting a primary VM 200-1, executing on a primary host 100-1, with the primary VM and backup VM each accessing its separate virtual disk on separate physical devices. The primary VM 200-1 is the "real" VM that is actually communicating externally of the virtualized computer system. The backup VM 200-2 is configured to take over and "go-live," almost instantaneously in some embodiments, if the primary host 100-1 or primary VM 200-1 fails.

Figure 1:
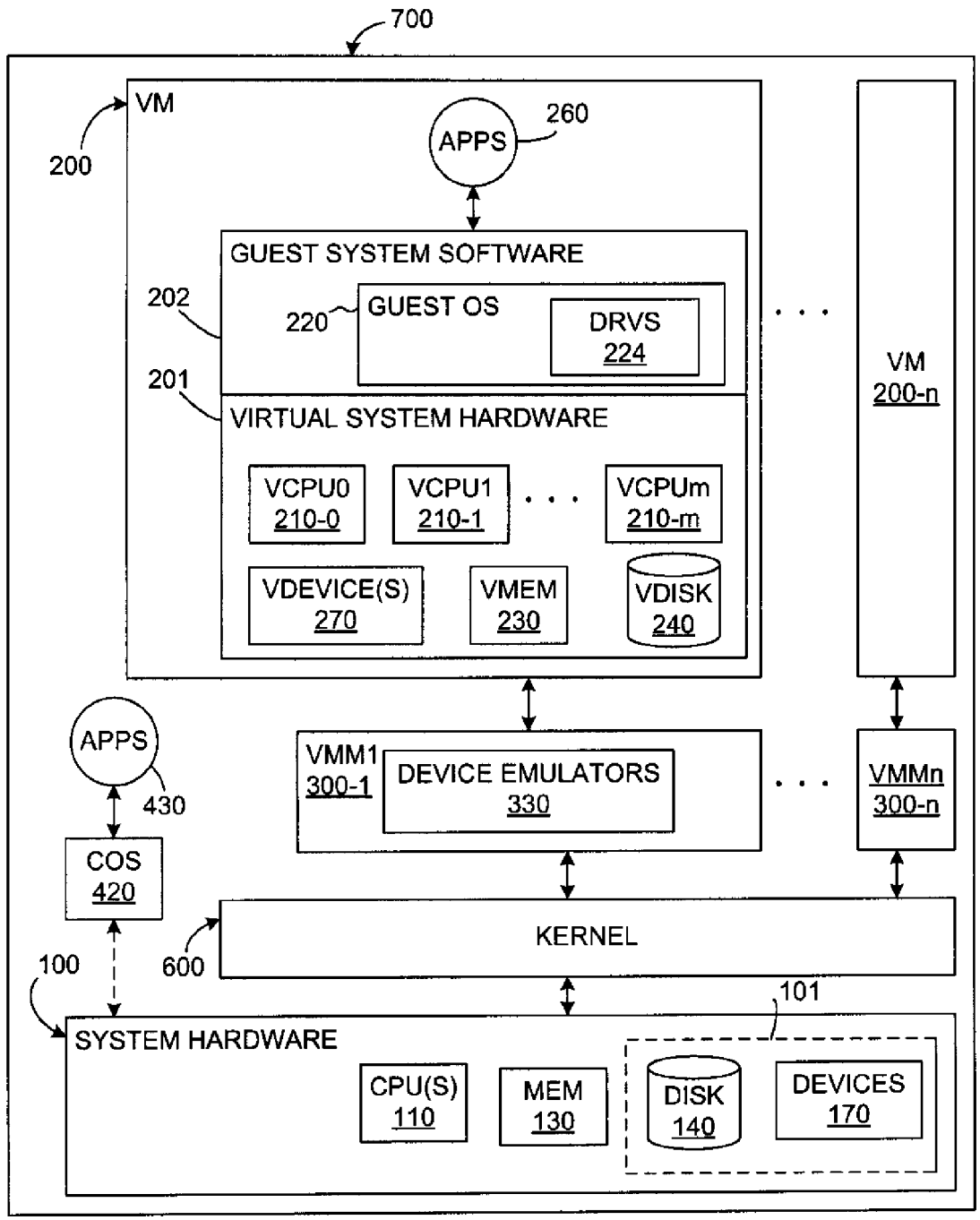
FIG. 1 illustrates a non-hosted virtualized system.

The primary VM 200-1, which includes a VCPU 210-1 and a guest OS 220-1, is supported by a hypervisor 601-1, including a VMM 300-1 and a VMkernel 600-1, on the host system hardware 100-1. The primary VM 200-1 includes or accesses its own separate virtual disk 240-1, on a physical disk 140-1, as explained previously with reference to FIG. 1. The backup VM 200-2, which includes a VCPU 210-2 and a guest OS 220-2, is supported by a hypervisor 601-2, including a VMM 300-2 and a VMkernel 600-2, on host system hardware 100-2. The backup VM 200-2 includes or accesses its own separate virtual disk 240-2, on a physical disk 140-2, as explained previously with reference to FIG. 1. As explained above, the distinction between the various virtualization software such as the VMkernels 600-1, 600-2, the VMMs 300-1, 300-2, and the hypervisors 601-1, 602-2, may not be so clear depending upon the implementation of the virtualized computer system. For the purposes of this disclosure, any action performed by the VMkernels 600-1, 600-2 may be considered to be performed by virtualization software in a broader sense, such as by the hypervisors 601-1, 601-2.

One way of keeping the two VMs 200-1, 200-2 generally synchronized for fault tolerance is to record (log) all non-deterministic inputs or events encountered by the primary VM 200-1 in log entries 280 and send the log entries 280 to VMkernel 600-2 for the backup VM 200-2. In some embodiments, the backup VM 200-2 can be run in near lockstep with the primary VM 200-1. The VMkernel 600-1 corresponding to the primary VM 200-1 records such log entries and sends the log entries 280 to the VMkernel 600-2 corresponding to the backup VM 200-2. Non-deterministic inputs/events include, for example, (i) all inputs from the network external to the virtualized computer system, (ii) information regarding when virtual interrupts were delivered to the VCPU 210-1 due to external events, (iii) timer interrupts delivered to the VCPU 210-1, and (iv) timestamps delivered to the VCPU 210-1 when the VCPU 210-1 requires the current time via various hardware functionality. The hypervisor 601-2 then uses the log entries 280 to ensure that the backup VM 200-2 executes exactly the same instruction stream as the primary VM 200-1 (i.e., the backup VM 200-2 replays the log entries 280). More specifically, the backup VM 200-2 executes device emulation that does not require non-deterministic events, but inserts the non-deterministic events from the received log entries and replays such non-deterministic events from the recorded log entries 280. The VMkernel 600-2 sends acknowledgements 282 back to the VMkernel 600-1 indicating which log entries 280 have been received by the VMkernel 600-2 and which log entries 280 have been replayed on the backup VM 200-2.

For record/replay to function properly, the virtual disks 240-1, 240-2 of the primary VM 200-1 and the backup VM 200-2 start in the same state. The primary and backup VMs 200-1, 200-2 both read from and write to their virtual disks 240-1, 240-2, respectively, while executing. Since the backup VM 200-2 executes the same way as the primary VM 200-1 through record/replay, the backup VM 200-2 will perform the same IO (Input/Output) to its virtual disks 240-2 as the primary VM 200-1 does to its virtual disks 240-1, and therefore the virtual disks 240-1, 240-2 will naturally stay in synchronization. The initiation of a disk IO is not logged in the log entries 280, because it is a deterministic result of the VM's behavior. The completion of a disk IO is logged in the log entries 280, since the exact instruction when a completion interrupt is delivered is non-deterministic. In addition, the completion status of each disk IO is also logged in the log entries 280, since the completion status is an additional non-deterministic result of the disk IO.

Figure 3:
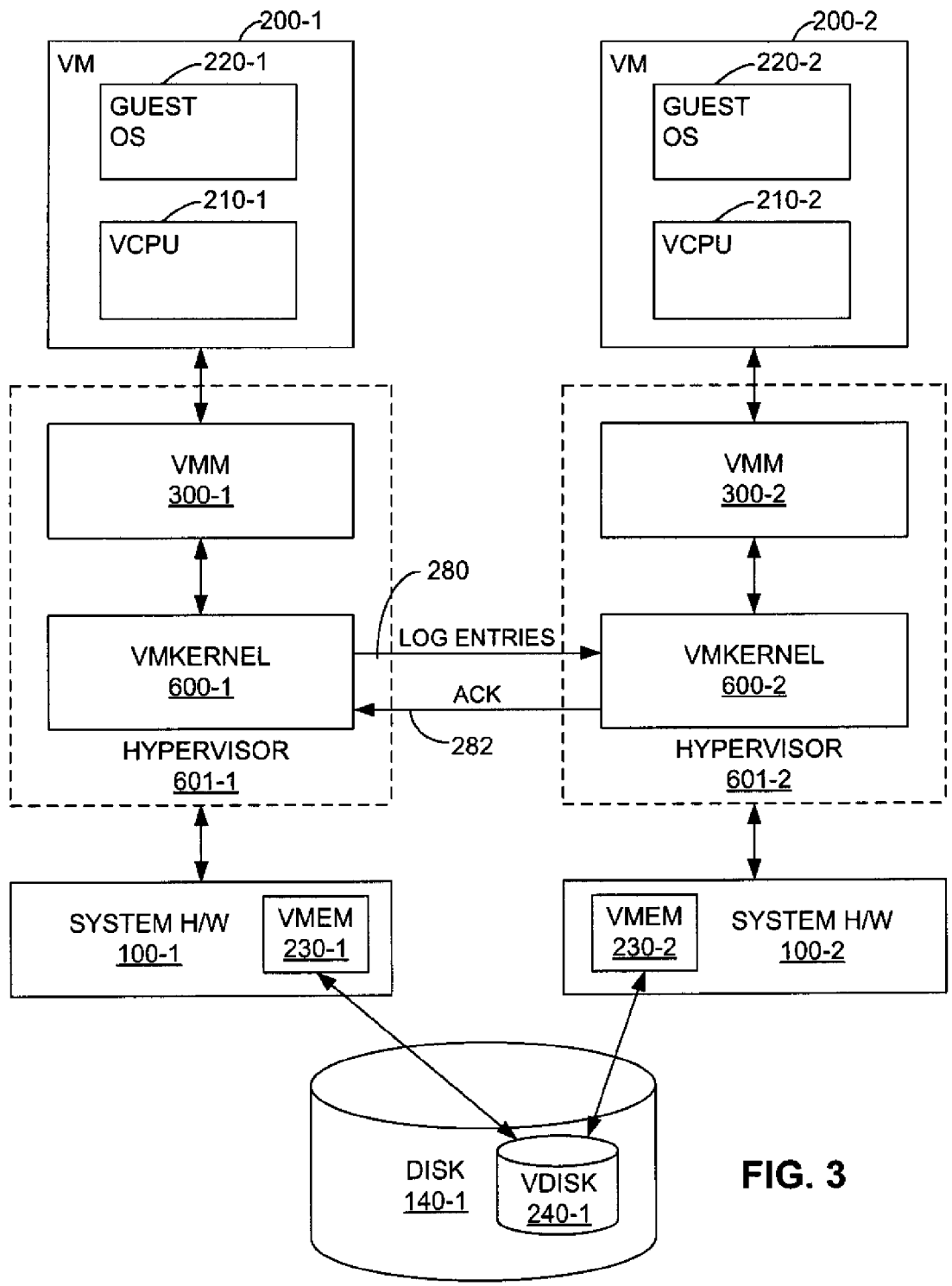
FIG. 3 illustrates a system for providing fault tolerance using a backup VM supporting a primary VM, with the primary VM and backup VM each accessing a shared virtual disk on a shared storage device, according to one embodiment.

FIG. 3 illustrates a method of providing fault tolerance using a backup VM 200-2 supporting a primary VM 200-1, with the primary VM and backup VM each accessing a shared virtual disk on shared physical devices, according to one embodiment. The primary VM 200-1 is the "real" VM that is actually communicating externally to the virtualized computer system. The backup VM 200-2 is configured to take over and go-live, almost instantaneously in some embodiments, if the primary host 100-1 or primary VM 200-1 fails.

The primary VM 200-1, which includes the VCPU 210-1 and the guest OS 220-1, is supported by the hypervisor 601-1, including the VMM 300-1 and VMkernel 600-1, on the host system hardware 100-1. The primary VM 200-1 includes or accesses a shared virtual disk 240-1 on a shared physical disk 140-1. The backup VM 200-2, which includes the VCPU 210-2 and the guest OS 220-2, is supported by the hypervisor 601-2, including the VMM 300-2 and the VMkernel 600-2, on host system hardware 100-2. The backup VM 200-2 also includes or accesses the shared virtual disk 240-1 on the shared physical disk 140-1.

In order to keep the two VMs 200-1, 200-2 generally synchronized for fault tolerance, all non-deterministic inputs or events encountered by the primary VM 200-1 may be recorded (logged) in log entries 280 and provided to VMkernel 600-2 for the backup VM 200-2. In some embodiments, the backup VM 200-2 can be run in near lockstep with the primary VM 200-1. The VMkernel 600-1 corresponding to the primary VM 200-1 records such log entries and sends the log entries 280 to the VMkernel 600-2 corresponding to the backup VM 200-2. Non-deterministic inputs/events include, for example, (i) all inputs from the network external to the virtualized computer system, (ii) information regarding when virtual interrupts were delivered to the VCPU 210-1 due to external events, (iii) timer interrupts delivered to the VCPU 210-1, and (iv) timestamps delivered to the VCPU 210-1 when the VCPU 210-1 requires the current time via various hardware functionality. The VMM 300-2 (or VMkernel 600-2) then uses the log entries 280 to ensure that backup VM 200-2 executes exactly the same instruction stream as the primary VM 200-1 (i.e., the backup VM 200-2 replays the log entries). The VMkernel 600-2 sends acknowledgements 282 back to the VMkernel 600-1, indicating which log entries 280 have been received by the VMkernel 600-2 and which log entries 280 have been replayed on the backup VM 200-2.

According to the embodiment shown in FIG. 3, the primary VM 200-1 and the backup VM 200-2 share the same, preferably reliable, storage disk 140-1 supporting the shared virtual disks 240-1. That is, there is only one set of one or more virtual disks 240-1 supported by the shared storage 140-1, and both VMs 200-1, 200-2 access the same virtual disks 240-1. This architecture has the advantage that fault tolerance (FT) may be started quickly without requiring that the backup VM's virtual disks be synchronized with the contents of the primary VM's virtual disks 240-1 as in the conventional separate virtual disk architecture shown in FIG. 2.

In the shared storage architecture of FIG. 3, the primary VM 200-1 issues both reads and writes to the virtual disks 240-1, while the backup VM 200-2 only sends reads to the virtual disks 240-1. The writes by the backup VM 200-2 are marked as completed by the 15 VMM 300-2, without actually issuing them.

In either the separate disk architecture of FIG. 2 or the shared disk architecture of FIG. 3, in order to allow the backup VM 200-2 to go-live in the event of a primary VM fault, certain issues should be addressed. First, at the point where the backup VM 200-2 "goes live," devices should be in a consistent state, i.e., the actual emulation states of the devices should be consistent with what the guest OS 220-2 assumes the emulation states of the devices to be. Second, at the point where the backup VM 200-2 "goes live," some pending IOs may need to be reissued, and some pending IO completions may need to be delivered to the guest OS 220-2.

In order to ensure that device states are consistent when the backup VM "goes live," each device emulation by the VMM 300-2, is modified to recognize that a VM can be either in replay mode or live mode. In replay mode, inputs are obtained from the recorded execution log 280 and some outputs may be discarded (e.g., network packets) or reissued (e.g., some modes of SCSI disks). In "live" mode, I/O is dealt with by the backup VM 200-2 executing normally.

However, even with these modifications of the device emulation, device emulation may not be consistent in certain situations. For example, an I/O device replaying a command completion might expect an I/O completion event followed by a series of log entries in the log file that contain the actual data. If the backup VM 200-2 is allowed to go live at any point in the middle of the emulation of a single instruction, it will unnecessarily complicate the implementation of recording and replay. Likewise if the granularity of going-live is made larger than a single instruction, it can complicate the implementation of recording and replay, and add unacceptable latencies to certain IO operations during replay. Rather than complicating device emulation implementation in order to deal with the backup VM going-live at any point in time, the backup VM 200-2 according to the present embodiment is allowed to go-live at instruction boundaries in the replay log 280.

Specifically, the emulation of any instruction can generate multiple log entries 280. For example, an OUT instruction to an I/O port can cause device emulation to run and generate multiple log entries. According to the present embodiment, the last log entry of that instruction is marked as the "go-live" point. This is because emulating an instruction can require many disparate portions of code to execute, each of which may generate a log, and that it is difficult to determine what the last log entry generated by instruction emulation is, until emulation of the instruction is completed. Thus, according to the embodiment, the last entry associated with an emulated instruction is marked as the go-live point before it is transmitted to the VMkernel 600-2 in the log file 280, and the backup VM 200-2 replays the log entries for that emulated instruction when the last log entry marked as the go-live point is received. Thus, at any moment, the backup VM 200-2 has replayed up to the go-live points in the log entries 280 at the instruction boundaries, and thus would be at a go-live point at any time when the backup VM 200-2 needs to enter live execution mode. This process is explained in more detail below with reference to FIGS. 4A, 4B, 5A, 5B, and 6.

Figure 4A:
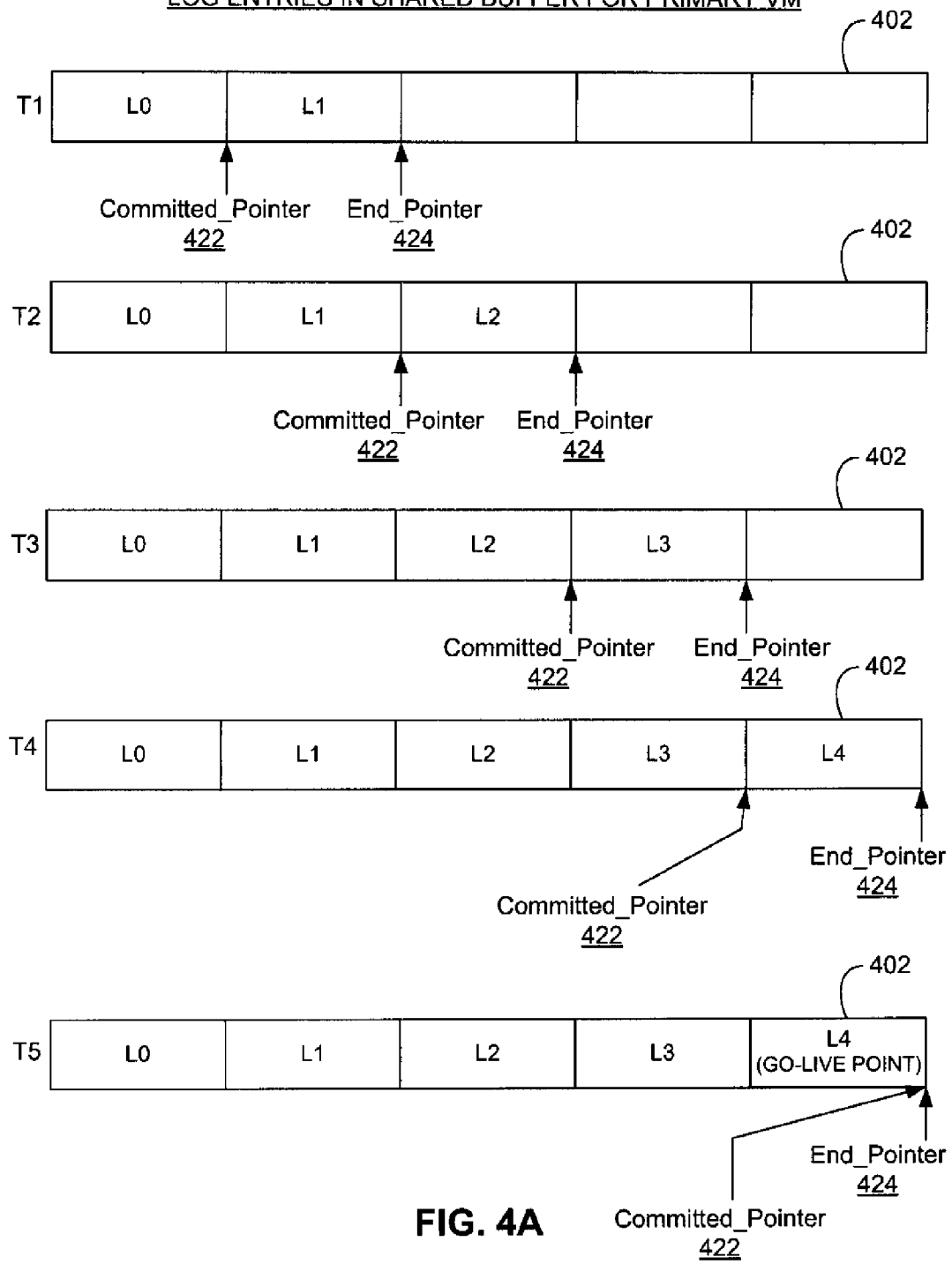
FIG. 4A illustrates a shared buffer for a primary VM to store the recorded log entries, according to one embodiment.
Figure 4B:
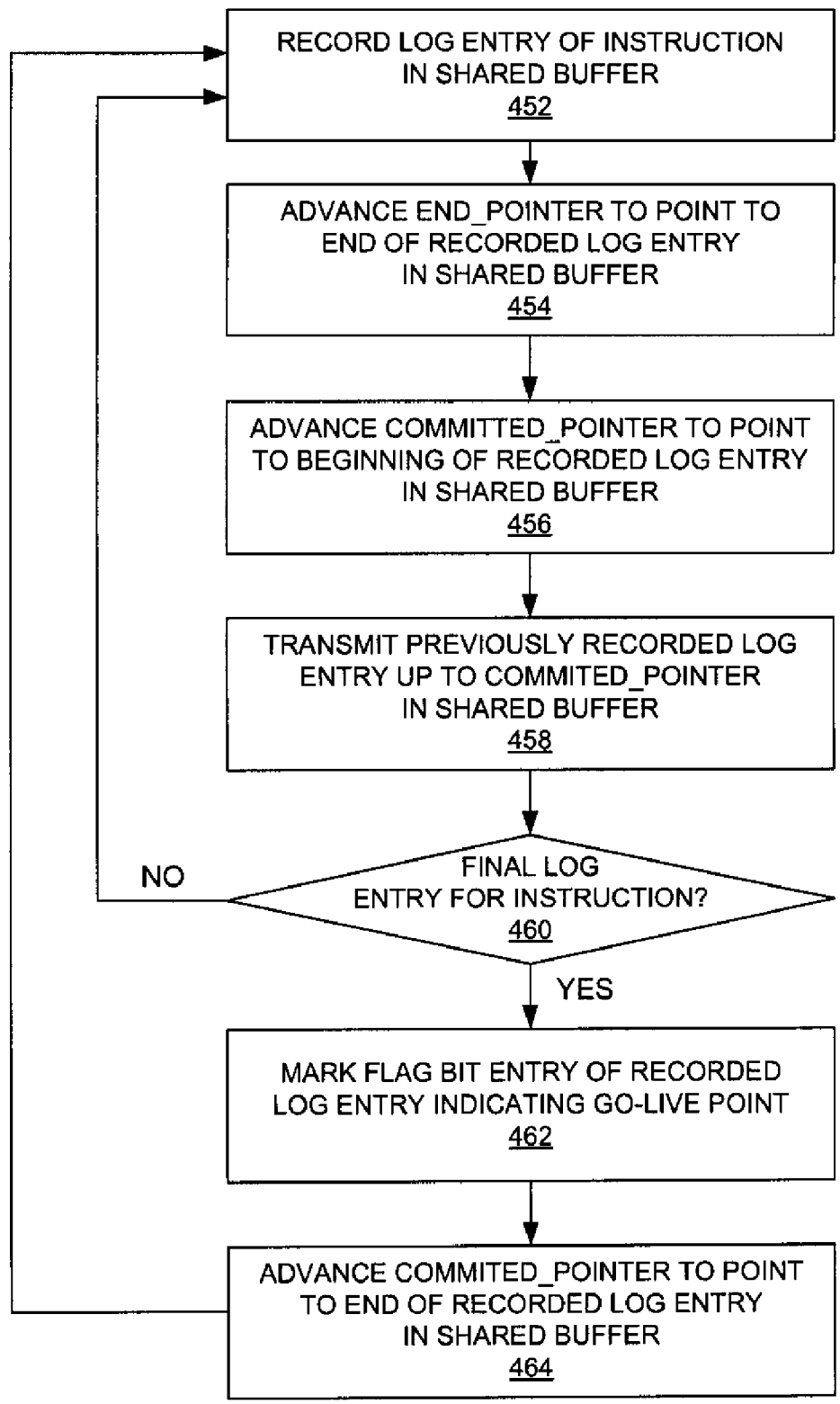
FIG. 4B illustrates a method for a primary VM to record log entries using go-live points, according to one embodiment.

FIG. 4A illustrates the shared buffer for the primary VM to store the recorded log entries according to one embodiment, and FIG. 4B illustrates a method for the primary VM to record log entries using go-live points according to one embodiment. Referring to FIG. 4A, the VMM 300-1 of the primary VM 200-1 maintains a data structure such as a shared buffer 402 in the VMM 300-1 (or VMkernel 600-1) memory to store the log entries as they are generated from execution of the instructions. Execution of a single instruction may generate multiple log entries, which are stored in the shared buffer 402, for example, in sequential order. The example shown in FIG. 4A assumes that a single instruction generates four log entries L1, L2, L3, and L4, and that the log entry L0 in FIG. 4A pertains to a previous instruction and has already been transmitted to the VMM 300-2 (or VMkernel 600-2). The VMM 300-1 also maintains at least two pointers, Committed_Pointer 422 and End_Pointer 424. The Committed_Pointer 422 points to the address of the shared buffer 402 up to which the log entries 280 are allowed to be transmitted to the VMM 300-2. The End_Pointer 424 points to the address of the shared buffer 402 at the end of the last generated log entry.

Referring to FIG. 4B, the VMM 300-1 records 452 a log entry generated by the execution of a guest instruction in the shared buffer 402. The VMM 300-1 advances 454 the End_Pointer 424 to point to the end of the recorded log entry in the shared buffer 402, and advances 456 the Committed_Pointer 422 to point to the beginning of the recorded log entry in the shared buffer 402. Then, the log entry up to where the Committed_Pointer 424 points in the shared buffer 402 (that was previously recorded but not transmitted yet) can be transmitted 458 to the backup VM 200-2. The VMM 300-1 determines 460 whether that last recorded log entry is the final log entry for the instruction. The VMM 300-1 is fully aware of whether the log entry is the final log entry of an emulated instruction, since it is the VMM 300-1 that is in charge of device emulation and execution of instructions in the virtualized computer system. If the last recorded log entry is not the final log entry for the instruction, the process returns to step 452 to repeat steps 452, 454, 456, 458, and 460 for the subsequently recorded log entry of the instruction.

This situation is illustrated in FIG. 4A. At time T1, the log entry L1 is recorded (log entry L0 was previously recorded) and the Committed_Pointer 422 and the End_Pointer 424 each point to the beginning and end, respectively, of the recorded log entry L1. Since the log entry L1 is not the final log entry for the corresponding instruction, such process is repeated. Thus, at time T2, log entry L2 is recorded and the Committed_Pointer 422 and the End_Pointer 424 each point to the beginning and end, respectively, of the recorded log entry L2. At time T3, log entry L3 is recorded and the Committed_Pointer 422 and the End_Pointer 424 each point to the beginning and end, respectively, of the recorded log entry L3. At time T4, log entry L4 is recorded and the Committed_Pointer 422 and the End_Pointer 424 each point to the beginning and end, respectively, of the recorded log entry L4.

Referring back to FIG. 4B, if the recorded log entry is the final log entry for the emulated instruction in step 460, then the VMM 300-1 changes 462 a flag bit entry of the recorded log entry to indicate that it is the final log entry of that instruction. This change 462 of the flag bit entry indicates a go-live point for the backup VM 200-2 when the VMM 300-2 receives the recorded log entries. Then, the VMM 300-1 advances the Committed_Pointer 422 to point to the end of the recorded log entry in the shared buffer 402, and the process returns to step 452 to record the next log entry pertaining to another instruction.

Steps 460, 462, and 464 are also illustrated in FIG. 4A. Since the log entry L4 recorded at time T4 is determined to be the last log entry of the instruction by the VMM 300-1, the flag bit entry of the recorded log entry L4 is changed to indicate a go-live point for the backup VM 200-2. The Committed_Pointer 422 is also advanced to point to the end of the memory address of the recorded log entry L4 in the shared buffer 402. As can be seen from FIG. 4A, the latency introduced by the method of FIG. 4B in transmitting the log entries 280 from the primary VM 200-1 to the backup VM 200-2 is merely one log entry, stored in the shared buffer 402 between the Committed_Pointer 422 and the End_Pointer 424. Thus, the method of FIG. 4B, in some embodiments, does not introduce any significant latency in the record process of the primary VM 200-1.

In other embodiments of the invention, however, the sequence of steps 452, 454, 456 and 458 may not always be performed precisely as illustrated in FIG. 4A. For example, recorded log entries may not be transmitted according to step 458 each time a single log entry is recorded, such that there may be multiple log entries that have been recorded, but not yet transmitted. In this event, step 458 may be performed multiple times, or multiple log entries may be transmitted, without recording any new log entries, such that the transmission of log entries may catch up with the recording of log entries.

Figure 5A:
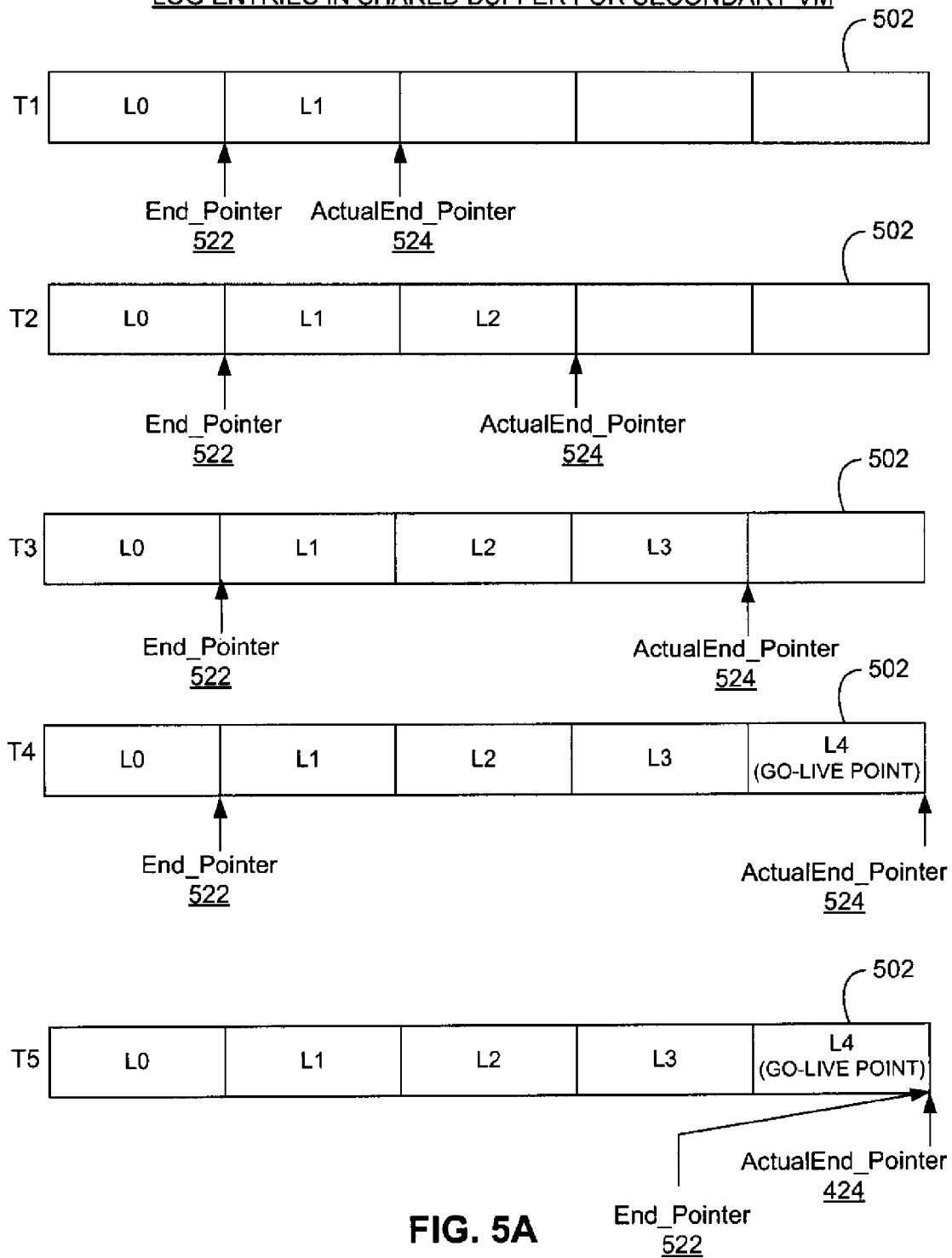
FIG. 5A illustrates a shared buffer for a backup VM to store the log entries received from a primary VM, according to one embodiment.
Figure 5B:
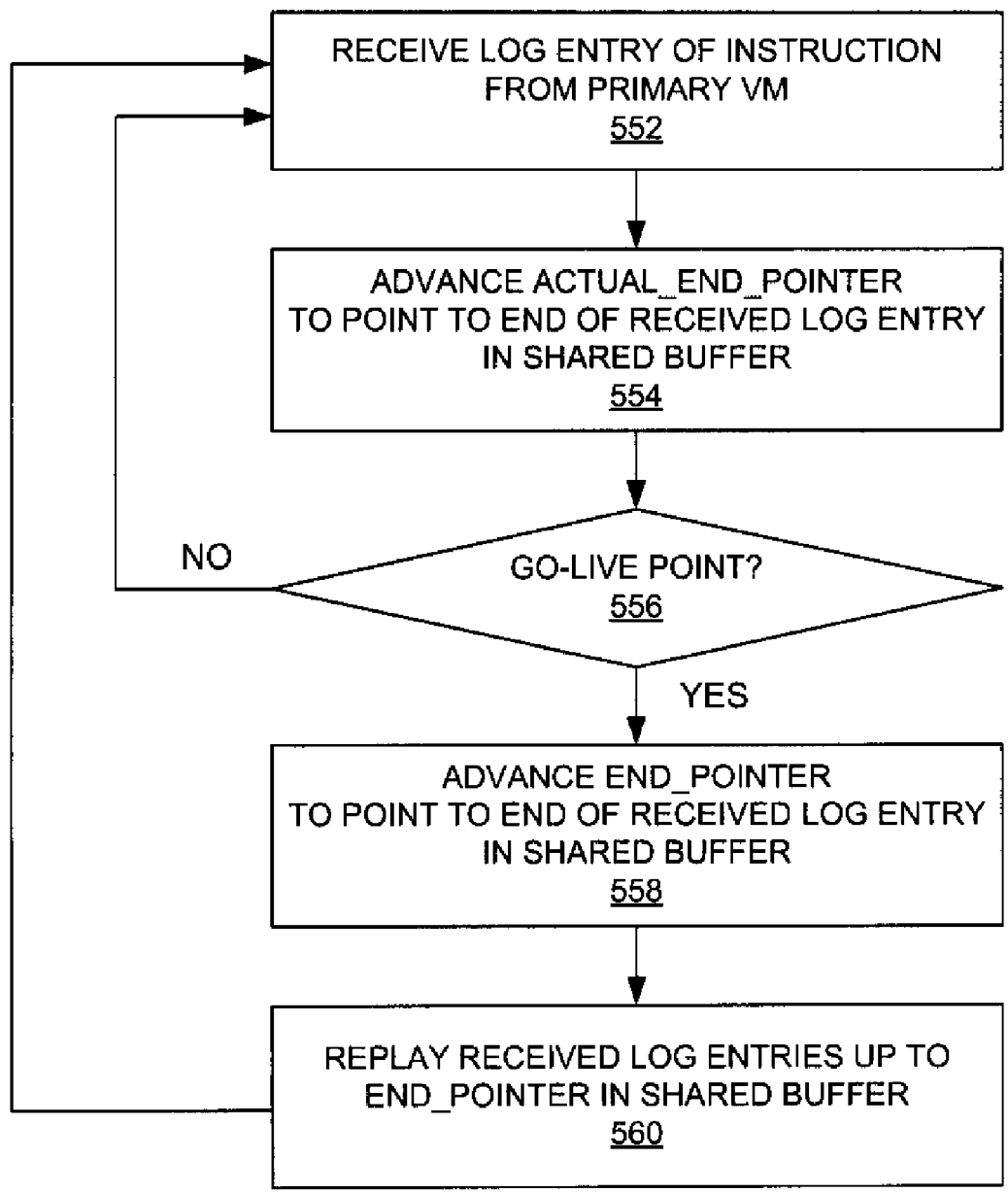
FIG. 5B illustrates a method for a backup VM to replay the log entries using go-live points, according to one embodiment.

FIG. 5A illustrates the shared buffer for the backup VM to store the log entries received from the primary VM according to one embodiment, and FIG. 5B illustrates a method for the backup VM to replay the log entries using go-live points according to one embodiment. Referring to FIG. 5B, the VMM 300-2 of the backup VM 200-2 also maintains a data structure such as a shared buffer 502 in the VMM 300-2 (or VMkernel 600-2) memory to store the log entries 280 as they are received from the primary VM 200-1. Execution of a single instruction may cause multiple log entries to be received, which are stored in the shared buffer 502, for example, in sequential order. The example shown in FIG. 5A assumes that a single instruction generated four log entries L1, L2, L3, and L4 which are received by the VMM 300-2, and that the log entry L0 in FIG. 5A pertains to a previous instruction and had already been received by the VMM 300-2. The VMM 300-2 also maintains at least two pointers, End_Pointer 522 and ActualEnd_Pointer 524. The End_Pointer 522 points to the address of the shared buffer 502 up to which the log entries 280 can be replayed by the backup VM 200-2. The ActualEnd_Pointer 524 points to the address of the shared buffer 502 at the end of the last received log entry.

Referring to FIG. 5B, the VMM 300-2 of the backup VM 200-2 receives 552 the log entry 280 provided from the primary VM 200-1 and stores it in the shared buffer 502. The VMM 300-2 advances 554 the ActualEnd_Pointer 524 to point to the end of the received log entry in the shared buffer 502. Then, the VMM 300-2 determines 556 whether the flag bit entry of the received log entry indicates a "go-live" point. If the flag bit entry of the received log entry 280 does not indicate a go-live point, then the process returns to step 552 to repeat steps 552, 554, 556.

This situation is illustrated in FIG. 5A. Log entry L0 was previously received and replayed by the backup VM 200-2. At time T1, the log entry L1 is received 552 by the VMM 300-2 for the backup VM 200-2 and the ActualEnd_Pointer 524 is advanced 554 to point to the end of the recorded log entry L1. However, the End_Pointer 522 is not advanced and continues to point to the end of log entry L0 corresponding to the end of the log entries for the previous instruction. Since the log entry L1 is not the final log entry for the corresponding instruction and thus would not include the go-live point indication in log entry L1 (according to the method of FIG. 4A), such process is repeated. Thus, at time T2, log entry L2 is received 552 and the ActualEnd_Pointer 524 is advanced 554 to point to the end of the received log entry L2. However, the End_Pointer 522 is not advanced and continues to point to the end of log entry L0 corresponding to the end of the log entries for the previous instruction. At time T3, log entry L3 is received 552 and the ActualEnd_Pointer 524 is advanced 554 to point to the end of the received log entry L3. However, the End_Pointer 522 is not advanced and continues to point to the end of log entry L0 corresponding to the end of the log entries for the previous instruction. At time T4, log entry L4 is received 552 and the ActualEnd_Pointer 524 is advanced 554 to point to the end of the recorded log entry L4.

Referring back to FIG. 5B, if the flag bit entry of the received log entry 280 does indicate a go-live point in step 556, the End_Pointer 522 is advanced 558 to also point to the end of the last received log entry. Then, the VMM 300-2 causes the backup VM 200-2 to replay 560 the received log entries (that have not been replayed yet) up to the End_Pointer 522 in the shared buffer 502. The process then returns to step 552.

Steps 556, 558, and 560 are also illustrated in FIG. 5A. Since the log entry L4 received at time T4 includes a flag bit that indicates a "go-live" point as added by the VMM 300-1 (in FIG. 4A), the End_Pointer 522 is also advanced to point to the end of the received log entry L4 in the shared buffer 502. The VMM 300-2 then replays the log entries L1, L2, L3, and L4 (up to where End_Pointer 522 points).

By use of the process illustrated in FIGS. 4B and 5B, at any moment, the backup VM 200-2 has only replayed up to the go-live points in the log entries 280. Thus, the backup VM 200-2 would be at a go-live point at any time when the backup VM 200-2 needs to enter live execution mode. Thus, the process of FIGS. 4B and 5B naturally prevents the VM 200-2 from entering live execution mode in the middle of emulation of a single instruction.

Figure 6:
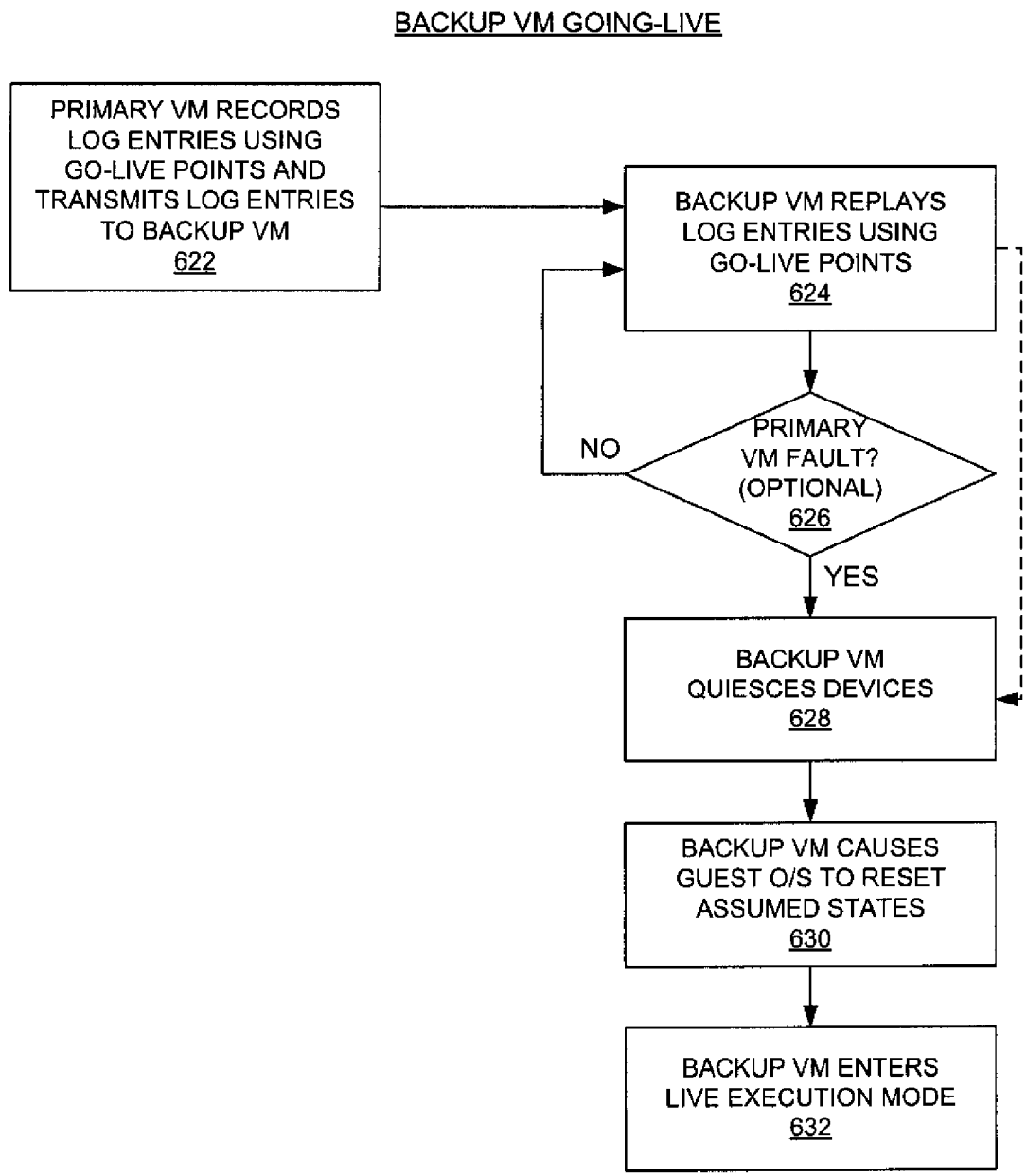
FIG. 6 illustrates a method for a backup VM to resume interactive operation using go-live points, according to one embodiment.

FIG. 6 illustrates a method for the backup VM to resume interactive operation and "go-live" using go-live points, according to one embodiment. As explained above, the VMM 300-1 for the primary VM 200-1 records 622 log entries using the go-live points as illustrated in FIGS. 4A and 4B, and transmits 622 the log entries 280 to the VMM 300-2 for the backup VM 200-2. The backup VM 200-2 replays 624 the received log entries up to the go-live points, as illustrated in FIGS. 5A and 5B, until the primary VM faults 626. If the primary VM faults 626, certain steps are performed before the backup VM 200-2 is allowed to enter live execution mode.

Specifically, the VMM 300-2 for the backup VM 200-2 quiesces 628 devices so that each device is allowed to go into a state consistent with the state that the backup VM 200-2 assumes the devices to be in. Quiescing a device generally means allowing all pending IOs of that device to complete. For networking devices, quiescing is done by canceling all transmits. For disks, quiescing is handled differently depending upon whether the disks are shared as in FIG. 3 or not shared as in FIG. 2. With a shared disk configuration as in FIG. 3, disk write operations are issued by the primary VM 200-1 but not by the backup VM 200-2. Hence, when the backup VM 200-2 enters live execution mode, the backup VM 200-2 reissues any writes for which the backup VM 200-2 did not receive a completion log entry 280 from the primary VM 200-1. However, for reads, since the backup VM 200-2 does issue reads in the shared disk configuration as in FIG. 3, the VMM 300-2 just delivers completion interrupts to the guest OS 220-2 (rather than reissue the reads) for any reads for which the backup VM 200-2 did receive a completion log entry from the primary VM 200-1. For a non-shared disk configuration as in FIG. 2, any IO completions for both reads and writes that were not yet delivered to the guest OS 220-2 are delivered without waiting for completion.

There are some devices for which the guest's assumption of what the state is after replaying will often be different from what the actual state is externally when the backup VM 200-2 goes live. One example is the case where the guest OS 220-2 accesses the host state, for example, the host-guest file system where the guest OS 220-2 is allowed access to the hosts file system. In order to refresh the devices' states when the backup VM 200-2 goes live, the virtualization software may cause 630 the guest O/S 220-2 to reset its assumed states for the various devices by calling the devices to reset their state. Other examples of devices of which the states are generally refreshed include a USB (Universal Serial Bus) interface, a physical CDROM drive, sound card device, etc. Any device which has any state on the primary host, generally cannot be replayed at the backup host unless the same device is present in the same state on the backup host. In situations where the states of the device are not the same between the primary host and the backup host, the state of the device is reset 630 prior to "go-live" at the backup host, usually by issuing a 'device disconnected' message up to the device at the backup VM 200-2.

With steps 628, 630 complete, the backup VM 200-2 is now ready to go-live and enter interactive execution mode. Thus, the backup VM 200-2 enters 632 live execution mode (and takes over the operation of the faulted primary VM 200-1 in case of a primary VM fault). Because the backup VM 200-2 has replayed the log entries 280 only up to the go-live points at instruction boundaries, the backup VM 200-2 would be at a go-live point at any time when the backup VM 200-2 enters 632 live execution mode. Thus, the backup VM 200-2 would not be able to go live in the middle of emulation of a single instruction.

Note that step 626 in FIG. 6 is optional in that the backup VM 200-2 may enter live execution mode and proceed to step 628 directly (as indicated with the dashed arrow between steps 624 and 628 in FIG. 6) without a primary VM fault. For example, the backup VM 200-2 may replay the log entries up to a certain point and then be allowed to enter live execution mode, for debugging purposes, or for other uses.

Upon reading this disclosure, those of skill in the art will appreciate still additional alternative structural and functional designs for allowing the backup VM to enter live execution when the primary VM faults, through the disclosed principles of the present disclosure. Thus, while particular embodiments and applications have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure herein.

What is claimed is:

1. A method performed in a virtual computer system for transitioning a second virtual machine (VM) from a replay mode to a live mode, the virtual computer system comprising one or more physical computers and virtualization logic, the virtualization logic supporting a first VM and the second VM, the method comprising:

logging non-deterministic events that occur at the first VM;

communicating the logged events to the virtualization logic supporting the second VM;

for each guest instruction executed or emulated in the first VM that results in one or more logged events, identifying a final log entry for the guest instruction that signifies logging of a complete set of the logged events for the guest instruction, the final log entry being a logging of a final non-deterministic event occurring as a consequence of the execution or emulation of the guest instruction; and at the second VM, for each such guest instruction which results in one or more logged events and for which a final log entry has been identified:

running the second VM in the replay mode based on the events logged at the first VM, by replaying the complete set of logged events for the guest instruction only after detection that the final log entry is identified, thereby mimicking operation of the first VM as a backup in the execution or emulation of the guest instruction; and as a response to a determination to transition the second VM from the replay mode to the live mode, stopping the replay mode and entering the live mode only after completion of the replaying of the complete set of logged events of the guest instruction and not during the replaying of the complete set of logged events of the guest instruction.

2. The method of claim 1, wherein, after the determination is made to transition the second VM from the replay mode to the live mode, the second VM continues to replay the complete set of logged events of the guest instruction.

3. The method of claim 1, wherein, after the determination is made to transition the second VM from the replay mode to the live mode, the second VM continues to replay each complete set of logged events which is available for subsequent guest instructions executed or emulated at the first VM following the guest instruction, such that the second VM replays the guest instructions on an instruction-by-instruction basis and only for those guest instructions for which the final non-deterministic event has occurred.

4. The method of claim 1, further comprising quiescing devices at the second VM before transitioning the second VM from the replay mode to the live mode.

5. The method of claim 4, further comprising causing a guest operating system running in the second VM to reset assumed states for devices before transitioning the second VM from the replay mode to the live mode.

6. The method of claim 1, wherein the virtual computer system comprises a first physical computer and a second physical computer, and the virtualization logic comprises a first virtualization logic for supporting execution of the first VM on the first physical computer and a second virtualization logic for supporting execution of the second VM on the second physical computer.

7. The method of claim 6, wherein the first virtualization logic logs non-deterministic events that occur at the first VM and transmits information about those events to the second virtualization logic.

8. The method of claim 7, wherein the first virtualization logic further transmits to the second virtualization logic final log entry information about which logged events are the final log entries resulting from the execution or emulation of the guest instructions, and the second virtualization logic using this final log entry information to designate the complete set of logged events for the executed or emulated guest instruction and causing the second VM to transition from the replay mode to the live mode only after replaying such a complete set of logged events and not during replay of the complete set of logged events.

9. The method of claim 7, wherein the information about the logged events is transmitted from the first virtualization logic to the second virtualization logic in a series of log entries, with one entry for each logged event.

10. The method of claim 9, wherein a bit in each of the log entries is used to indicate whether the logged event is a final log entry resulting from the execution or emulation of a guest instruction.

11. The method of claim 1, wherein the step of transitioning the second VM from the replay mode to the live mode is responsive to a determination that a fault has occurred in connection with the operation of the first VM.

12. The method of claim 1, wherein the second VM operates in near lockstep with the operation of the first VM.

13. A computer storage having stored therein a computer program, the computer program being executable in a virtual computer system and performing a method for transitioning a second virtual machine (VM) from a replay mode to a live mode, the virtual computer system comprising one or more physical computers and virtualization logic, the virtualization logic supporting a first VM and the second VM, the method comprising:

logging non-deterministic events that occur at the first VM;

communicating the logged events to the virtualization logic supporting the second VM;

for each guest instruction executed or emulated in the first VM that results in one or more logged events, identifying a final log entry for the guest instruction that signifies logging of a complete set of the logged events for the guest instruction guest instruction, the final log entry being a logging of a final non-deterministic event occurring as a consequence of the execution or emulation of the guest instruction; and at the second VM, for each such guest instruction which results in one or more logged events and for which a final log entry has been identified:

running the second VM in the replay mode based on the events logged at the first VM, by replaying the complete set of logged events for the guest instruction only after detection that the final log entry is identified, thereby mimicking operation of the first VM as a backup in the execution or emulation of the guest instruction; and as a response to a determination to transition the second VM from the replay mode to the live mode, entering the live mode only after completion of the replaying of the complete set of logged events of the guest instruction, such that the replaying of only a portion of the complete set of logged events of the guest instruction is averted.

14. The computer storage of claim 13, wherein, after the determination is made to transition the second VM from the replay mode to the live mode, the second VM continues to replay the complete set of logged events of the guest instruction.

15. The method of claim 13, wherein, after the determination is made to transition the second VM from the replay mode to the live mode, the second VM continues to replay each complete set of logged events which is available for subsequent guest instructions executed or emulated at the first VM following the guest instruction, such that the second VM replays the guest instructions on an instruction-by-instruction basis and only for those guest instructions for which the final non-deterministic event has occurred.

16. The computer storage of claim 13, the method further comprising quiescing devices at the second VM before transitioning the second VM from the replay mode to the live mode.

17. The computer storage of claim 16, the method further comprising causing a guest operating system running in the second VM to reset assumed states for devices before transitioning the second VM from the replay mode to the live mode.

18. The computer storage of claim 13, wherein the virtual computer system comprises a first physical computer and a second physical computer, and the virtualization logic comprises a first virtualization logic for supporting execution of the first VM on the first physical computer and a second virtualization logic for supporting execution of the second VM on the second physical computer.

19. The computer storage of claim 13, wherein the step of transitioning the second VM from the replay mode to the live mode is responsive to a determination that a fault has occurred in connection with the operation of the first VM.

20. The computer storage of claim 13, wherein the second VM operates in near lockstep with the operation of the first VM.

21. A virtual computer system comprising one or more physical computers and virtualization logic, the virtualization logic supporting a first virtual machine (VM) and a second VM, the virtualization logic performing a method for transitioning the second VM from a replay mode to a live mode, the method comprising:
    logging non-deterministic events that occur at the first VM;
    communicating the logged events to the virtualization logic supporting the second VM;
    for each guest instruction executed or emulated in the first VM that results in one or more logged events, identifying a final log entry for the guest instruction that signifies logging of a complete set of the logged events for the guest instruction, the final log entry being a logging of a final non-deterministic event occurring as a consequence of the execution or emulation of the guest instruction; and
    at the second VM, for each such guest instruction which results in one or more logged events and for which a final log entry has been identified:
        running the second VM in the replay mode based on the events logged at the first VM, where during replay mode the second VM inserts the logged events into the guest instruction such that the complete set of logged events are applied at the second VM for the guest instruction only after the final log entry is identified; and
        as a response to a determination to transition the second VM from the replay mode to the live mode, entering the live mode only after completion of the replaying of the complete set of logged events of the guest instruction.

22. The virtual computer system of claim 21, wherein, after the determination is made to transition the second VM from the replay mode to the live mode, the second VM continues to replay the complete set of logged events of the guest instruction.

23. The virtual computer system of claim 22, wherein, after the determination is made to transition the second VM from the replay mode to the live mode, the second VM continues to replay each complete set of logged events which is available for subsequent guest instructions executed or emulated at the first VM following the guest instruction, such that the second VM replays the guest instructions on an instruction-by-instruction basis and only for those guest instructions for which the final non-deterministic event has occurred.

24. The virtual computer system of claim 21, the method further comprising quiescing devices at the second VM before transitioning the second VM from the replay mode to the live mode.

25. The virtual computer system of claim 24, the method further comprising causing a guest operating system running in the second VM to reset assumed states for devices before transitioning the second VM from the replay mode to the live mode.

26. The virtual computer system of claim 21, wherein the virtual computer system comprises a first physical computer and a second physical computer, and the virtualization logic comprises a first virtualization logic for supporting execution of the first VM on the first physical computer and a second virtualization logic for supporting execution of the second VM on the second physical computer.

27. The virtual computer system of claim 21, wherein the step of transitioning the second VM from the replay mode to the live mode is responsive to a determination that a fault has occurred in connection with the operation of the first VM.

28. The virtual computer system of claim 21, wherein the second VM operates in near lockstep with the operation of the first VM.

\* \* \* \* \*